United States Patent [19]

Snyman

[11] 4,009,619
[45] Mar. 1, 1977

[54] ACCELEROMETERS
[76] Inventor: Mattheus Johannes Snyman, 805 Lukas Meyer St., Tileba, Pretoria, Transvaal, South Africa
[22] Filed: Apr. 18, 1975
[21] Appl. No.: 569,406
[30] Foreign Application Priority Data
Apr. 19, 1974 South Africa ..................74/2501
[52] U.S. Cl. ............................................. 73/517 R
[51] Int. Cl.² ........................................ G01P 15/08
[58] Field of Search ............. 73/492, 510, 514–517; 200/61.51; 235/92 AE
[56] References Cited
UNITED STATES PATENTS

| | | | |
|---|---|---|---|
| 2,521,918 | 9/1950 | Hudson | 73/517 R |
| 2,986,614 | 5/1961 | Minch | 200/61.51 X |
| 3,372,386 | 3/1968 | Klinger | 73/517 R X |
| 3,665,769 | 5/1972 | Morris | 73/517 R |
| 3,769,844 | 11/1973 | Skoures | 73/517 R |

*Primary Examiner*—James J. Gill

[57] ABSTRACT

The invention provides for an accelerometer having an acceleration responsive means associated with a presence detector for detecting the continuous activation of the acceleration responsive means for a predetermined time duration. The accelerometer may further have recording and indicating means responsive to the presence detector. The accelerometer may particularly be used in a motor vehicle to detect excessive acceleration thereof.

7 Claims, 5 Drawing Figures

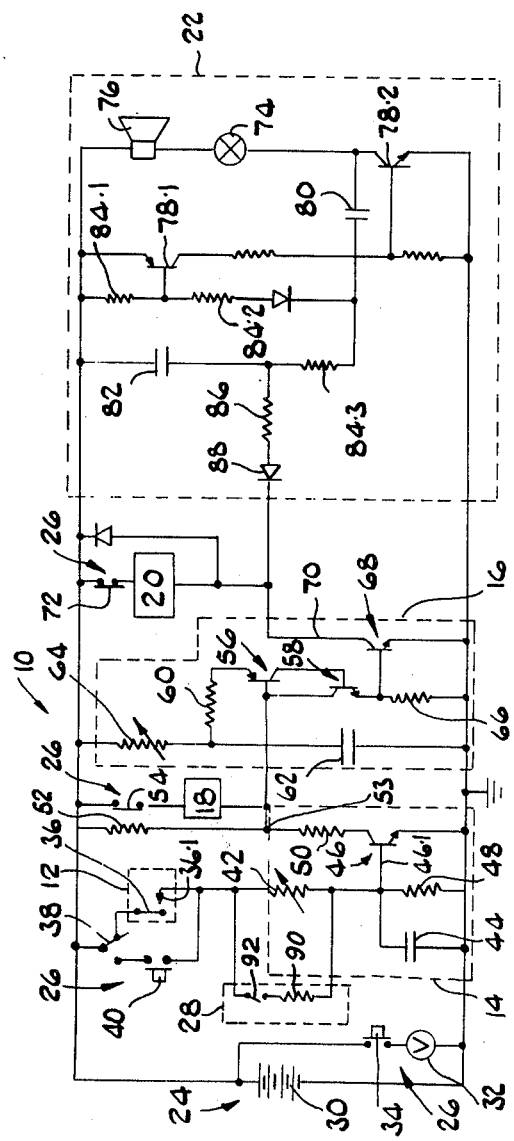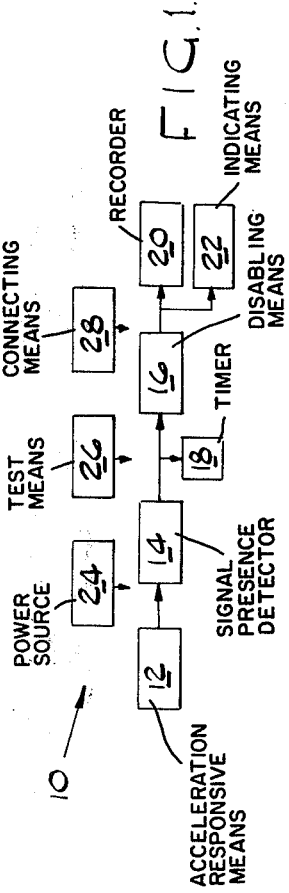

ACCELEROMETERS

BACKGROUND OF THE INVENTION

This invention relates to improvements in or relating to accelerometers for use with vehicles and to vehicles having the accelerometers.

According to the invention there is provided an accelerometer which includes a means responsive to acceleration which provides an output signal in response to acceleration, and a signal presence detector associated therewith adapted to detect the continuous presence of an output signal from the acceleration responsive means for a predetermined time duration.

In this specification by "acceleration" is to be understood both positive and negative acceleration, i.e. acceleration and deceleration, unless otherwise indicated. Further, by accelerometer is meant a device or apparatus sensitive to acceleration.

The acceleration responsive means may be responsive to inertial forces and to linear or centripetal acceleration. The acceleration responsive means may be adapted to provide a digital output signal. Conveniently, it may be a binary, "on-off" device. The acceleration responsive means may be a pendulum, a mercury switch or a crystal transducer.

The presence detector may be variable such that the predetermined time duration may be varied.

The accelerometer may be electrically, magnetically, mechanically or hydraulically operable. The accelerometer is preferably electrically operable. Accordingly the acceleration responsive means may be adapted to provide an electrical output signal the presence detector being electrically operable.

In one embodiment, the acceleration responsive means may comprise an electrically conductive pendulum and a contact, the pendulum and the contact having electrical connection means with the pendulum being pivotable into contact with the contact, due to predetermined inertial accelerative force, to electrically bridge the connection means.

The presence detector may comprise an integrator and a level detector, the integrator being supplied from a voltage source via the pendulum and the contact. The integrator may conveniently be in the form of a series capacitive/resistive network, the level detector being set to detect a voltage level substantially less than the supply voltage. A discharge path for the capacitor is provided in this embodiment.

Recording means, responsive to the presence detector and adapted to record relevant particulars when the acceleration responsive means has been actuated for the predetermined time duration, may be provided. The recording means may for example be a counter for counting the number of times the acceleration responsive means is actuated for the predetermined time duration, or a timer for recording the aggregate amount of time in excess of the predetermined time duration that the acceleration responsive means is actuated. The accelerometer may for example be associated with an object in which case the recording means may be a camera, movie or still, for photographing the scene about the object.

Similarly, indicating means may be provided, the indicating means being responsive to the presence detector. These indicating means may be visually or audibly operable. They may for example be lamps, buzzers, loudspeakers, a hooter, etc.

The accelerometer may further include disabling means, responsive to the presence detector, for rendering the recording and/or indicating means insensitive to actuation by the response means for a predetermined time duration after the presence detector has detected an actuation of the acceleration responsive means. Accordingly, if the acceleration responsive means is sufficiently actuated a number of times during this disabled period, the recording means or indicating means will only record or indicate one actuation. The disabling means may include a ramp generator and a level detector arranged to form a time base. Alternatively, electronic digital techniques may be utilized, e.g., by means of a monostable multi-vibrator. The disabled time duration may also be variable.

Analogue or digital electronic techniques may also be utilized for the presence detector or other elements. Similarly discrete components or integrated circuit components may be utilized.

In order to test whether the accelerometer is operating correctly a test means may be included. The test means may be operatively connected to the presence detector to actuate the presence detector by providing it with a simulated signal from the acceleration responsive means. The test means may also be interconnected with any recording and/or indicating means to disable them when the operation of the accelerometer is being tested. Thereby test signals supplied to the presence detector are not recorded or indicated as being true actuations of the acceleration responsive means. The test means may further be lockable so that only authorized persons can test the accelerometer.

The acceleration responsive means may be further adapted to provide one of a number of output signals dependent on the character of the acceleration. For example, the output signals may be dependent on the quantized amplitude of the acceleration or on the direction of the acceleration. In one embodiment the acceleration responsive means may be electrically operable and comprise a pendulum and a plurality of contacts. The contacts may be arranged to be successively contacted as the pivotal angle of the pendulum increases to be responsive to the amplitude of the acceleration; or they may be disposed in a plane about the pendulum to be responsive to the direction of the acceleration. Alternatively, in another embodiment, a plurality of acceleration responsive elements, such as pendulums, may be utilized, each of the elements being responsive to acceleration of a predetermined magnitude or direction.

With such acceleration responsive means, a plurality of presence detectors may be provided, one for each of the output signals of the acceleration responsive means. Similarily, a plurality of recording means and/or indicating means may be provided, each being responsive to one of the presence detectors. By this means the magnitude of the acceleration responded to by the acceleration responsive means, or its directions, may be independently recorded and/or indicated.

The accelerometer may have mounting means for mounting it in a vehicle, particularly a motor vehicle. The connecting means may have electrical connection means for electrically connecting the accelerometer to control apparatus and/or operating elements of the vehicle. For example, the accelerometer may have its own power source, or it may be connectable to a source of electrical power, such as an accumulator in the vehicle; or the accelerometer may be interconnected with the windscreen wipers or headlamps of the vehicle to render the acceleration responsive means or the presence detector more sensitive.

The accelerometer's components may conveniently be housed in a tamper-proof sealed housing. The accelerometer may be self-sufficient or it may be removable receivable in a bracket which is mountable in a vehicle and connectable by suitable connecting means to elements of the vehicle.

The accelerometer may have a region, e.g., on the housing, on which a datum reference value may be recorded. This datum reference value may for example be the odometer reading of the vehicle or the date of installation, or the date of initial use, of the accelerometer.

An accelerometer for use with a vehicle may further have instructions to the driver exhorting and explaining to him how to drive safely.

The invention further provides a vehicle having an accelerometer according to the invention.

The invention will now be described by way of examples, with reference to the accompanying drawings, in which:

FIG. 1 shows a block diagram of an accelerometer according to the invention;

FIG. 2 is a circuit diagram of an electrically operable embodiment of the accelerometer;

Figure 3:
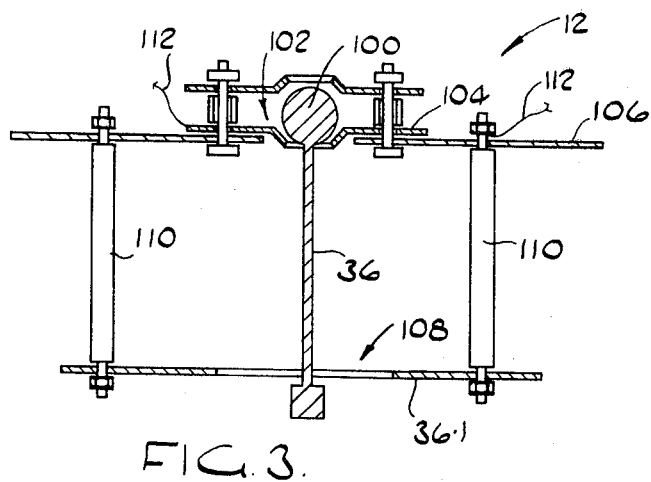
FIG. 3 shows a sectional view of a pendulum for use with the embodiment of FIG. 2.

Referring to FIG. 1, the accelerometer is referred to generally by reference numeral 10. The accelerometer 10 comprises an acceleration responsive means 12 connected to a signal presence detector 14. The presence detector 14 in turn drives a disabling means 16 and a timer 18. The output of the disabling means 16 is connected to a recording means 20 and an indicating means 22. The accelerometer 10 further includes a source of power 24 and a test means 26 for testing the operation of the accelerometer 10. If the accelerometer 10 is for use with a motor vehicle, then it further comprises a means 28 for inter-connecting the components of the accelerometer 10, to interact with the vehicle's controls.

In operation, the acceleration responsive means 12 responds to acceleration to emit a signal to the signal presence detector 14 when it is actuated. The acceleration responsive means 12 is such that it only emits a signal if the acceleration which it responds to is of a predetermined magnitude. In this manner the output of the acceleration responsive means is quantized in a binary format, i.e., either ON or OFF.

The presence detector 14 processes the signal which it receives from the acceleration responsive means 12 and if the signal is continuously present for a predetermined time duration it emits a signal to the disabling means 16 and the timer 18. This time duration is variable. The timer 18 aggregates the amount of time that a signal is emitted from the presence detector, i.e., the amount of time in excess of the presence time duration that the acceleration responsive means is actuated. On receipt of a signal from the presence detector 14, the disabling means 16 activates the recording means 20 and the indicating means 22. It then disables the recording means 20 and the indicating means 22 for a predetermined time duration by not emitting an activation signal during this period if subsequent signals are received from the presence detector during this period. This time duration is also variable.

The recording means may be any suitable means, such as a counter, which counts the number of activation signals it receives; a camera; or the like. Similarly the indicating means 22 may give a visual and/or audible indicating signal. It may accordingly be a lamp, or buzzer, a loudspeaker, a hooter, or the like.

If the accelerometer 10 is mounted in a vehicle, in order to sense the acceleration experienced by the vehicle, the accelerometer may be interconnected and interact with the vehicle's controls. In one embodiment, activation of the lights or windscreen wipers of the vehicle interacts with the presence detector 14 to decrease the presence time duration, rendering the accelerometer more sensitive.

The operation of the accelerometer is tested by activating the test means 26. The test means 26 then emits a signal of sufficient duration to the presence detector 14. If the accelerometer 10 is operating correctly then the timer 18, any other recording means 20 and the indicating means will all be activated. The test means 26 may further disable the timer 18 and the other recording means 20 so that they are not activated.

It is to be understood that the above elements of the accelerometer 10 may be greatly varied without departing from the spirit or the scope of the invention. For example, the accelerometer may be operable by any suitable means—mechanically, hydraulically or pneumatically, but preferably electrically. Further, the acceleration responsive means 12 may be such as to emit a plurality of signals depending on the character of the acceleration. In this event, a corresponding number of presence detectors 14 may be provided for each signal, each of the presence detectors having their own associated disabling means 16, timers 18 and recording means 20. Only one indicating means 22 may be provided, actuable by a signal from any of the signal paths provided by the presence detectors.

Referring to FIG. 2, the circuit diagram of a particular electrically operable accelerometer 10 is shown. The various sections of the circuit corresponding to the elements of the block diagram of FIG. 1 are correspondingly numbered. The various elements are now considered.

The circuit is powered by a power source 24 comprising a 6 volt battery 30. A voltmeter 32 is connected across the battery 30, via a push-button switch 34 for checking the EMF of the battery 30. The voltmeter 32 and switch 34 form part of the test means 26.

The acceleration responsive means 12 comprises a pendulum 36 which is pivotal to form a bridge between the battery 30 and the presence detector 14. The pendulum 36 is indicated in more detail in FIG. 3 and 4, and will be considered hereinafter. A two-pole switch 38 and a push-button switch 40 are provided to disconnect the pendulum 36 and by-pass it.

The presence detector 14 comprises a series network of a variable resistance 42 and a capacitor 44, their junction connected to the base 46.1 of a transistor 46. The contact 36.1 of the pendulum 36 is connected to the resistance 42. A further discharge resistance 48 is connected in parallel with the capacitor to ground. The collector 46.2 of the transistor 46 is connected via biassing resistances 50 and 52 to the positive supply of the battery 30. Their junction is connected to the timer 18 and the disabling means 16. The timer 18 is further connected via a normally closed isolating switch 54 to the positive supply.

The disabling means 16 comprises two interconnected transistors 56 and 58, the bases and the collectors of the two transistors being connected. The emitter of the transistor 56 is connected via a safety resistance 60 to the junction between a capacitor 62 and a variable resistance 64, the resistance 64 and capacitor 62 being serially connected across the power supply 24. The base of the transistor 56 comprises the input to the disabling means 16 and is connected, in parallel with the timer 18 to the junction 53 of the resistances 50 and 52. The emitter of the transistor 58 is connected via a safety resistance 66 to each and to the base of a switching transistor 68. The emitter of this transistor is earthed, the collector forming the output 70 of the disabling means, 16.

The output 70 of the disabling means 16 is connected to one terminal of the counter 20, the other end of which is connected via a normally closed isolating switch 72 to the positive supply. The counter 20 is electro-magnetically operated.

The output 70 is also connected to the indicating means 22. The indicating means 22 has a light emitting diode 74 and a coil driven loudspeaker 76. The operation of the LED 74 and the loudspeaker 76 is controlled by a circuit having two transistors 78.1 and 78.2 connected as an oscillator, with a capacitor 80 providing the necessary feedback. The control circuit also includes a timing network provided by a capacitor 82 and three resistances 84.1, 84.2 and 84.3. A further interface resistance 86 and diode 88 are connected to the output 70 as shown.

A further resistance 90 is connected, via a normally open switch 92 across the variable resistance 42 of the presence detector 14. The switch 92 is interconnected with the windscreen wiper and/or headlamps of a vehicle (not shown) in which the accelerometer 10 is installed.

The voltmeter 32 and switch 34, the switches 38 and 40, and the switches 54 and 72 comprise the test means 26 of FIG. 1.

In normal operation, when the pendulum 36 is actuated, in response to inertial accelerative forces, it engages the contact 36.1 and the capacitor 44 starts charging. If the pendulum 36 is actuated for a sufficient period of time, determined by the relevant values of the resistances 44 and 48, the capacitor 44, the base-emitter resistance of the transistor 46 and the switch-on voltage of the transistor, the capacitor 44 is sufficiently charged and the transistor 46 switches ON. This period is of the order of 10 to 200 milliseconds.

The voltage at the junction point 53 drops, activating the timer 18. The timer 18 records accumulatively the amount of time the transistor 46 remains ON, i.e., the total time in excess of the presence time duration that the pendulum is actuated.

Further, as the voltage at the junction point 53 drops below the supply voltage, the transistor 56 and subsequently the transistors 58 and 68 are switched ON. The capacitor 62, which was charged to the supply voltage then discharges to earth through the resistance 60 (which is of a low value) and the transistors 56, 58 and 68. As the transistor 56 is now reverse biased, it switches OFF, switching the other two transistors 58 and 68 also OFF. As this transistor 56 will remain reverse biased, even if the transistor 46 is ON, until the capacitor 62 has been charged ramp-wise sufficiently through the resistance 64. The disabling means 16 accordingly reacts to a signal from the presence detector 14 and then does not react and isolates the counter 20 and the indicating means 22 for a time duration determined by the resistance 64 and the capacitor 62. This period is about 2 seconds.

When the transistor 68 switches on momentarily in response to an initial signal from the presence detector 14, a current pulse flows through the counter 20 activating it and increasing the count by 1.

Also, when the transistor 68 switches ON, the capacitor 82 discharges through it, and via the resistance 86 and the diode 88. The transistors 78.1 and 78.2 are accordingly enabled, acting as an oscillator with a frequency determined by the capacitor 80 and the inductance of the coil of the loudspeaker 76. The loudspeaker 76 accordingly emits a noise and the LED 74 glows. The capacitor 82 however charges up through the resistances 84.1 and 84.2 until the transistor 78.1 is no longer forwardly biased. The indicating means 22 is then de-activated until it receives a further pulse from the disabling means 16. The indicating means 22 is accordingly activated for about 1 second.

To test the accelerometer 10, the switch 38 is operated to remove the pendulum 36 from the circuit. The switches 54 and 72 may be linked to the switch 38 to be simultaneously opened to isolate the timer 18 and the counter 20. The switch 38 may be lockable so that only authorised persons may test the accelerometer 10. The press-button switch 40 is closed, providing the presence detector with an activating signal. If the circuit is operating correctly, the loudspeaker 76 and the light 74 are operated.

Figure 4:
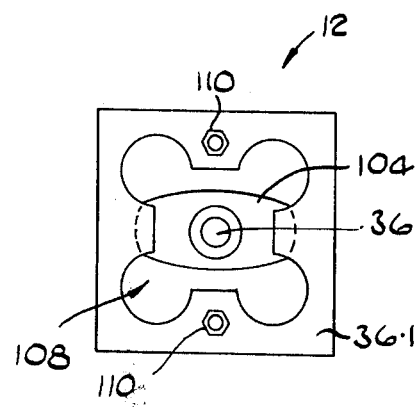
FIG. 4 shows an underneath plan view of the pendulum of FIG. 3.

Referring to FIGS. 3 and 4, an embodiment of the acceleration responsive means 10 is shown having a pendulum 36 as its operative element. The pendulum 36 is electrically conductive and has a spherical formation 100 at its upper end. This formation 100 is receivable in a cup-shaped indentation 102 in a metal support plate 104 so that the pendulum 36 is freely pivotable. A contact plate 36.1, spaced from the support plate 104, is provided having an opening 108 in which the pendulum is receivable. The support plate 104 and the contact plate 36.1 are both mounted on an insulating base board 106 which may conveniently be part of a printed circuit board. The contact plate 36.1 may be mounted by means of metal bolts 110. The support plate 104 and the contact plate 36.1 are connected to the circuit components shown in FIG. 2 by wire connectors 112 or by circuit connectors printed on the base board 106.

If the pendulum 36 experiences an inertial force, it pivots away from its rest position. If the inertial force is of a sufficient magnitude, the pendulum 36 engages the contact plate 36.1, forming an electrical bridging connection.

Figure 5:
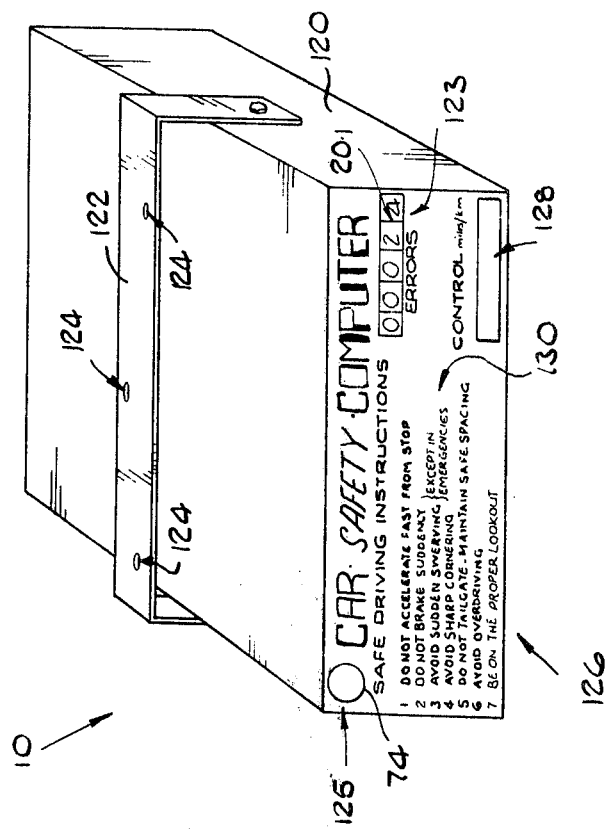
FIG. 5 shows a three-dimensional view of a housing for the accelerometer, suitable for use in a vehicle.

FIG. 5 shows a housing 120 for the accelerometer 10. The housing 120 is sealed so that the counter and timer of the accelerometer 10 are tamper-proof. The housing 120 has a mounting bracket 122 by means of which it may be mounted in a motor vehicle (not shown) utilizing the holes 124. Apertures 123 and 125 are provided in the front wall 126 of the housing 120 so that the reading 20.1 of the counter and the LED 74 may be visible. A region 128 is also provided where a datum reference mileage reading of the vehicle may be recorded. The front wall 126 further has instructions 130 instructing the driver of the vehicle as to safe driving procedure.

By this means, any excessive acceleration of the vehicle, due to excessive acceleration, braking or cornering, causes the pendulum to be actuated, thereby registering on the counter. Accordingly, for each driving error incurred by the driver, the counter registers a count thereby recording the driving pattern of the driver.

Further, as the pendulum is required to be activated for a predetermined time duration, spurious operation of the pendulum not due to excessive driving of the vehicle but due to resonant excitation of the pendulum are not acted on. This can for example occur when driving over a bumpy road. A further aspect is that if the pendulum is activated a number of times in a short time period, e.g., by the sharp application of the vehicle's brakes several times in a short period, due to the disabling means only one "driving error" is recorded. If the vehicle undergoes the excessive acceleration for longer than this disabled period, indicating excessive driving, then more than one error is recorded.

Accordingly, if a driver drives within a speed limit, e.g., an urban speed limit of 60 KM/H and he brakes excessively, the vehicle will be able to come to a halt in the disabled time period, thereby registering only one error. However, if he exceeds this speed, and he requires to brake excessively to come to a halt, the pendulum will be actuated for longer than the disabled period and more than one error will be recorded. By this means an indirect relationship between the speed of the vehicle and the driver's driving pattern is obtained.

I claim:

1. Apparatus for detecting and recording abuse of a motor vehicle, including:
   an acceleration responsive means which provides a first output signal responsive to acceleration of the vehicle above a preset level;
   a signal presence detector means connected to the acceleration responsive means providing a second output signal when the first output signal persists for a first predetermined period of time;
   a recorder;
   means responsive to the second output signal for actuating the recorder and then preventing the recorder from recording any further signals during a second period of time substantially greater than the first period of time.

2. Apparatus as claimed in claim 1, in which the signal presence detector means is variable to vary the first time period.

3. Apparatus as claimed in claim 1, in which the means responsive to the second output signal is variable to vary the second time period.

4. Apparatus as claimed in claim 1, in which the acceleration responsive means is responsive to linear and centripetal inertial forces.

5. Apparatus as claimed in claim 1, which includes visual indicating means and the means responsive to the second output signal also activates the indicating means.

6. Apparatus as claimed in claim 1, which includes audible indicating means and the means responsive to the second output signal also activates the indicating means.

7. Apparatus as claimed in claim 1, which includes test means for supplying an artificial first output signal to the signal presence detector means to test the operation of the apparatus.

* * * * *